a filtering apparatus, the useful life of which will not be shortened by its premature saturation with the filtered residue or by saturation-induced discontinuities in the filtering medium.

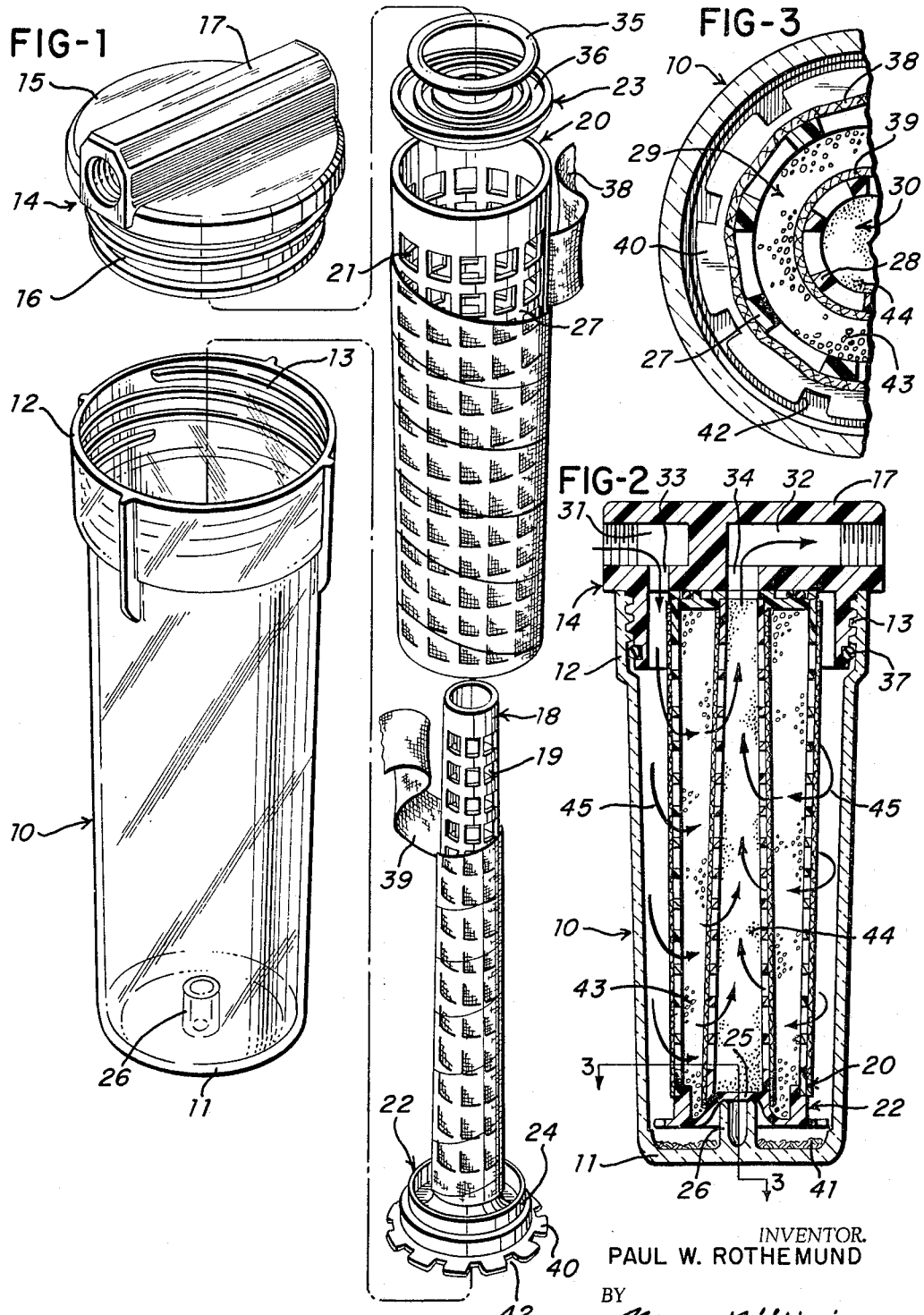

3,289,847
FLUID FILTERING AND TREATING APPARATUS
Paul W. Rothemund, 143 S. Walnut St., Yellow Springs, Ohio
Filed Mar. 26, 1963, Ser. No. 268,022
8 Claims. (Cl. 210—266)

The present invention relates to an apparatus for the filtering or related treatment or conditioning of fluids and particularly to a novel filtering cartridge to be employed therein.

The steady growth of our population, its degree of urbanization, increased industrialization and certain advances in technology attending the same have all contributed to the problem of providing an adequate water supply which is uncontaminated to the point at which it is reasonably safe for human consumption and related domestic usage. While most political subdivisions in the United States have provided elaborate water treating systems for their respective populations, the capacity of these is being exceeded because of the ever-increasing demands thereon and the increase and complication of various contaminating influences. There still remain however, many areas and great numbers of people in our country beyond the reach of governmentally treated water supplies even though they are exposed to the contaminating influences from urban and industrial areas. The problem is perhaps even more acute in other nations of the world, particularly the tropical and sub-tropical areas, wherein disease and contamination factors are more prevalent but water treating facilities are often scarce and in many cases non-existent.

Accordingly, emphasis of late has been placed upon the development of treating and filtration devices for use in individual residential structures to provide point-of-consumption water conditioning. While the development of the prior art has been thus primarily concerned with water supply, such individual filtering and treating devices have been considered for various industrial applications such as the purification of milk, carbonated water and other industrially treated liquids, the removal of small amounts of water from oil and petroleum liquids, the isolation of blood plasma and the like.

Perhaps the most successful assaults that have been made upon these problems in the prior art have involved the provision of a sump or casing, adapted to be inserted in the individual fluid supply at or near its point of consumption, and of a generally cylindrical filter cartridge inserted in the sump in such a way that all of the water entering the sump must pass through a portion of the cartridge before re-entering the system. One particular, and again perhaps the most successful, modification of such a device to date has comprised a cylindrical cartridge having an axial passage therethrough and so combined with the sump that water entering the filtering unit is forced to pass from the exterior of the cylinder through the annular cross-section thereof to the axial bore from which it then re-enters the water supply flow. While the prior art cartridges used in such constructions have proved satisfactory for certain fluids or water supplies having a relatively low degree of contamination, in most, if not all cases, the life of the unit has been so short that the necessary rapidity of its replacement has rendered it very impractical from the standpoints of both economics and convenience. Generally, the filter cartridge becomes so saturated with the impurities and sediment being removed that flow through the filter is inhibited to an unacceptable degree. An even more serious problem has arisen however where the clogged filtering unit yields under the constant pressure of the water to cause a condition known as channeling which allows the flow to continue even though it is completely by-passing and unbenefited by any of the filtering effects of the unit. The danger here of course is that the consumer continues to use the water without knowledge that it has not benefited from an adequate and in many cases essential filtering. While the prior art has sought to prevent this latter defect by steadily increasing the thickness of the annular cross-section of the filter cartridge, little gain has been realized in view of the fact that the saturation or clogging continues to be concentrated near the exterior cylindrical surface and the added bulk of the filtering material radially inwardly therefrom is isolated from any filtering opportunity. In other cases, fine particles of sediment accumulate at the center of the thick filtering layer and clog it while the outer surface might, upon visual inspection appear to be free from obstruction. A further deficiency of the prior art devices in this field has been that, lacking the ability satisfactorily to filter any particular impurity, they have not even been adaptable to attempt to remove the ever-increasing variety of impurities, solids and other foreign materials present in our water.

As a result of all of the foregoing, deep concern is being expressed at all levels of our government and society about the seemingly uninhibited growth of the problem, particularly from the standpoint of human health; and it is not inconceivable that the fear inherent in such concern, especially when coupled with other co-existent threats to our survival, will undermine our national morale.

It is accordingly an object of the present invention to provide an improved fluid filtering and treating apparatus.

A more specific object of this invention is to provide a novel filter cartridge capable of satisfactorily conditioning contaminated water or other liquids to the extent that they will be fit for human consumption.

Another object is to provide such a cartridge capable of satisfactorily filtering or otherwise conditioning liquids for industrial uses.

Still another object is to provide a filtering apparatus which may be conveniently and economically employed at the point of fluid consumption.

Yet another object of the invention is to provide such a filtering apparatus, the useful life of which will not be shortened by its premature saturation with the filtered residue or by saturation-induced discontinuities in the filtering medium.

These and other objects and advantages which will be apparent from the following disclosure are herein gained by the provision of a sump-contained filter cartridge composed of concentrically aligned inner and outer perforated tubular members, either or both of which may be wrapped or clothed with a filtering layer, thereby to provide, in addition to the filtering layers themselves, concentrically aligned chambers, in one or both of which, additional filtering or conditioning materials may be housed. To maintain the tubular members in their concentrically aligned and chamber-defining relationship, end-caps are provided to completely close the tubes at one end and to close all but the opening of the innermost axial chamber at the other end. These caps may be formed integrally with the tubes or they may be provided with appropriately spaced annular grooves in which the tube ends may be inserted and held by their forced fit in the grooves or by appropriate adhesives or other fastening means. The total cartridge thus assembled is then inserted in a conventional sump or housing in such a manner that water flowing into the sump will be forced to flow into the chamber defined by the interior of the sump-wall and the exterior of the cartridge but may leave the sump only through the filtration chamber axially of the cartridge, so that all of such water will have had to pass through the perforations in both of the tubes and any filtering layers covering the same as well as through any filtration material in both of the chambers defined by the tubes. More or less conventional sealing means may be employed in a manner to be hereinafter more fully described to insure that this desired flow pattern is achieved and maintained.

One particularly important modification of the device generally described above involves the use of one or more layers of an elastic filtering material wrapped around one or both of the tubular members. A most salutary result of this construction has been found to be the fact that, as the water is flowing through the cartridge, the filtering layers will be nominally indented or dimpled in the direction of the water flow at the perforations but, upon the discontinuance of the water flow, will resume their original un-indented or un-dimpled configuration with a flipping action which loosens and knocks away sedimental material which may have been deposited thereon during the water flow. Particular additional advantages in this modified construction have been found to be obtainable by the provision at the base of the cartridge, as an appendage or extension of the end-cap or otherwise, of a sieve plate or screen which generally covers the entire cross-sectional area of the sump but has openings therethrough which allow the sedimentatious material thus flipped from the filtering layers to settle to the very bottom of the sump at a point below the sieve layers. It has been found that, once the sedimentatious material thus settles to the bottom, it is shielded from the turbulence of the re-instituted fluid flow and does not rise from the bottom of the sump to the point at which it might again have to be screened by the filtering layers. Greatly improved filtration life has thus been accomplished in a two-fold manner; first, the periodic automatic removal of the sedimentatious material from the filtering surfaces, and second, the accommodation of the sedimentatious material thus removed so that it requires no subsequent filtering.

The invention thus generally described may be more clearly understood by reference to the following detailed description of certain preferred embodiments thereof in connection with which reference may be had to the appended drawings.

In the drawings:

FIGURE 1 is an exploded view in perspective of one preferred filtering apparatus according to the present invention.

FIGURE 2 is an elevational view in cross-section of the assembled device illustrated in FIGURE 1.

FIGURE 3 is a fragmentary plan view in cross-section taken on the line 3—3 of FIGURE 2.

Referring now to FIGURE 1 the filtering apparatus is shown to comprise the outer casing or sump 10 in the form of a generally cylindrical or nominally tapered cylindrical container closed at its lower end 11 and open at its upper end 12 which is provided with means such as the threads 13 to receive and to hold the cap 14 which comprises the end-closing cover plate 15, the threaded projection 16, and the fluid conduit housing 17. The cartridge to be positioned within the housing 10 comprises the inner cylindrical or nominally tapered tubular member 18 characterized by the perforations 19 through the wall thereof, the outer cylindrical or nominally tapered tubular member 20 characterized by the perforations 21 through the wall thereof and the end caps 22 and 23 for respectively covering the lower and upper ends of the tubular members and holding them in their desired generally concentric alignment. In the embodiment illustrated and as best shown in FIGURE 2, the upper cartridge cap 23 is associated with the tubular members by the insertion of the ends of these members into annular recesses in the inner surface of the cap. The lower end cap 22 on the other hand, is shown to be integrally formed with the lower end of the tubular member 18 but associated with the lower end of the outer tubular member 20 by the insertion and forced fit of this tubular end in the annular marginal recess 24 of the cap 22. The manner of association between the caps and the tubular members is not critical however, it being sufficient merely that they be capable, by virtue of such association, of establishing and maintaining the tubular members in their proper relationship with respect to each other and with the casing and of sealing or partially sealing the cartridge at its ends. The lower cap 22, as best shown in FIGURE 2, is provided with a centrally located recess or indentation 25 which, when the cartridge is placed within the housing 10, will partially receive the lug or boss 26 projecting upwardly from the base 11 of the housing to position the cartridge substantially centrally of the interior sump chamber. A further function of the cartridge caps 22 and 23 is to control the fluid flow through the cartridge; and, toward this end, it will be observed that, while the cap 22 serves completely to close the lower openings of both of the tubular members 18 and 20, the upper cap, when it is positioned upon the upper ends of the tubular members, closes only that portion of the upper end of the outer tubular member 20 between its wall and the wall of the inner tubular member 18, leaving the upper end of this latter tubular member uncovered.

Referring now more particularly to FIGURES 2 and 3 and to the assembly of the components thus far described, it will be observed that the cartridge caps 22 and 23, along with the inner and outer tubular members 18 and 20, form an integrated cartridge skeleton having a generally cylindrical or nominally tapered outer wall 27, a generally cylindrical or nominally tapered inner wall 28, both of said walls being perforated but otherwise defining an outer chamber 29 and an inner-most axial chamber 30. This cartridge skeleton is then positioned within the casing 10 and held centrally aligned therein by the superimposition of the indentation 25 over the lug 26 at the base of the skeleton and by the planar abutment of the upper surface of the upper cap member 23 against the lower surface of the cover portion 15 of the cap 14.

Referring briefly to the cap 14, it will be observed that the fluid conduit housing 17 comprises an inlet bore or passage 31 and an outlet or discharge passage 32, the marginal portions of which are provided with means such as threads for the association with these passages of fluid-carrying pipes or fittings. In the manner of certain of the prior art devices, the inlet passage 31 is connected by an opening 33 through the cover plate 15 to the interior of the sump or housing exteriorly of the cartridge skeleton. The discharge passage or conduit 32 of the housing 17 however is connected by the opening 34 through the cover plate 15 to the inner chamber 30 defined by the wall 28 of the inner tubular member 18. Because of the abutment between the opposed surfaces of the cover 15 and the cartridge cap 23 when the assembly is closed and the threaded projection 16 of the cap 14 has been tightly screwed into the threaded top portion 12 of the sump housing, it will be observed that fluid entering the inlet passage 31 and the sump chamber through the opening 33 is completely separated from the exit opening 34 and the discharge passage 32 by the entire cartridge skeleton comprising the walls 27 and 28 and the chambers 29 and 30. This seal or separation of the inlet and discharge passages may be further improved by the provision of the washer or O-ring 35 positioned in an annular groove 36 on the upper face of the cap 23 at a point between its outer rim and its inner opening. A washer or O-ring 37, positioned in a peripheral groove on the projection 16 of the cap member 14, may be employed to effect a fluid-tight seal between the cap and the sump housing, thereby further to insure that all water entering the sump by the inlet passage 31 must depart via the discharge passage 32.

About the exterior surface of either or both of the perforated or retriculate filtering walls 27 and 28 of the tubular members 20 and 18 may be provided a layer of filtering material characterized by extremely fine openings therethrough or by interconnecting minute pores therein and opening upon the surfaces thereof. In the embodiments illustrated it will be noted that such filtering layers 38 and 39 are provided about the walls of both of the tubular members in the form of a flexible strip spirally wound about the exterior tubular surfaces. In lieu of this spiral winding, the filtering layers may be applied as continuous widths of material corresponding to the height or length of the tubular members with such material being circumferentially wound and spliced or anchored in position by conventional means including mechanical adhesives, clips, bands or the like, none of which are illustrated.

It has been found that particularly advantageous effects may be achieved where the filtering material, in addition to having very fine screening or filtering properties, is also elastic in nature, particularly where the unit is to be installed in a fluid system of intermittent-flow such as a residential water supply. Where such material is employed and particularly where the perforations are relatively large, i.e., from .20 to .50 inch in transverse dimension and the edges or margins of the perforations opening upon the tubular wall about which the filtering layer is applied are sharply defined as by the right angle corners illustrated, it has been found that, while fluid is flowing through the device, the filtering layers will tend to be urged, by the force of the flow, inwardly of the cartridge skeleton as a result of which the surface of the filtering layer, especially the outer layer, will become "dimpled" as illustrated in FIGURE 3. Upon stoppage of the fluid flow radially inwardly through the filter cartridge however, the elasticity of the filtering layers will cause them to return to their original substantially cylindrical configuration with a springing or flipping action with the very beneficial result that sedimentatious material which may, during the fluid flow have accumulated upon the filter layers (and this necessarily at the dimpled portions since it is through these only that the fluid is permitted by the tubular wall perforation to pass), will be loosened or flecked free of the filtering layer. This phenomenon is particularly significant insofar as the outer layer is concerned in that the sedimentatious material, once thrown off from the filter layer, is free to settle through the fluid remaining in the sump and surrounding the filter cartridge to the bottom of the sump, as a result of all of which the filter layer is in a very real sense self-cleaning.

The advantages gained from this self-cleaning may be further capitalized upon where a perforate screen or sieve member such as the notched flange or extension 40 at the base of the cap 22 is provided at a point spaced from the bottom 11 of the sump chamber. As illustrated in FIGURE 2, the sedimentatious material 41, once removed from the filter layer will settle to the bottom of the sump through the openings in the sieve member and there, by virtue of the shielding effect of the sieve which substantially spans the entire area of the sump will be free of exposure to the turbulence introduced upon re-institution of the fluid flow. The sieve plate need not be uniformly reticulated but may be characterized by notches 42 measuring on the order of .25 inch in width and depth at 30° intervals about and opening upon its periphery.

As best shown in FIGURE 2, the arrangement of the tubular components above described, together with the filter fabric layers applied about their outer surfaces provides distinct chambers 29 and 30 the former being defined by the walls of the concentrically positioned tubular members 18 and 20 and the latter being the chamber within the tubular member 18. In each of these chambers may be placed an additional filtering or fluid conditioning medium such as 43 and 44 the function of which may be a mechanical screening similar in nature to the filtering effect of the filter fabric layers 38 and 39 or which may provide a chemical or electro-chemical purification such as an ion-exchange surface reaction. Filtering materials which may be placed in either of the chambers to accomplish a mere additional screening of the water include sand, waddings of glass fibers or other fibrous materials and the like. Diatomaceous earth or finely divided charcoal may be employed in either of the chambers 29 and 30 to provide, in addition to a straining of the water flow, an adsorptive reaction wherein such impurities as pass through the filtering layers 38 and 39 will adhere to the surfaces of the material in the filtration chambers. Such materials similarly positioned may also remove by adsorption or absorption gases dissolved in a liquid and imparting odors or other undesirable properties thereto. Ion-exchange resins or materials of the zeolite type may be employed in these chambers to remove undesirable or deleterious ions or ionic groups present in the water and not removable by the filtering layers. It will be understood that a variety of different arrangements of the various filtering and conditioning materials may be employed with the same material in one or both of the chambers 29 or 30 with or without the interposition therebetween of a second filtering layer wrapped about the outer surface of the inner tubular member 18. Where the filtering or fluid treatment material in the innermost chamber 30 is of a type which would tend to be washed from the chamber by the flow of water therethrough, a suitable screen or plug, of a material such as that used in the filtering layers 38 and 39 for example, may be placed across the top of the chamber 30 to contain such filtering material. The determination of which of two filtering materials will be placed in the outer chamber 29 rather than the inner chamber 30 will be based upon the particular characteristics of the fluid to be treated by the apparatus.

Where desired, an additional filtration or water treatment chamber may be provided in the form of an extension of the fluid conduits within the cap housing 17 particularly by the extension of one or both of these conduits inwardly of the cap beyond the opening therethrough by means of which the fluid is allowed to enter or leave the sump chamber. Such additional chamber is shown to be provided by the extension of the inlet passage 31 radially inwardly beyond the opening 33 in the cap 14; and, in this chamber, an additional filtering or conditioning material may be provided, particularly such a material as will be effective upon contact with the water, since most if not all of the water coming into the unit would be washed through the material lodged in such a chamber.

The result of the structure as above described is that, upon the introduction and flow of a fluid as represented by the arrows 45, the water will first flow around the exterior of the cartridge tending to wash from its exterior filter wrap any sedimentatious material deposited from previous filtrations and will then flow through this first filter layer 38, the perforations 21 in the wall 27 of the tubular member 20, the fluid treatment material within the chamber 29, the second filter layer 39 about the wall 28 of the inner tubular member 18 and finally through the material within the chamber 30 prior to exit through the discharge conduit 32 and return to the fluid system. Where the incoming water is further subjected to exposure to a filtering or treating medium lodged in the extension of the inlet passage 31, it can thus be seen that five separate filtering and/or treatment operations can be performed upon a continuous fluid flow by the same simply constructed and readily replacable unit. It can be appreciated that a wide variety of fluid filtering or treatment problems may be solved conveniently by the apparatus of this invention and that even severe problems can be eliminated by repeating a particular filtering operation at any one of the five potential separate stations therefor. Moreover, the self-cleaning aspects of the cartridge according to the present invention allow maximum usage of the finest filtering materials currently available whereas in the past, even though such finely filtering substances might have been available, their use was not attempted because the premature saturation and clogging thereof by insoluble materials in the fluid would take place almost immediately.

One specific embodiment of the filtering apparatus comprises an outer tubular member 20 which is 9.4 inches in length and approximately 2.7 inches in outside diameter with a wall thickness of .10 inch having perforations measuring .375 inch in longitudinal dimension and .25 inch in circumferential dimension; the perforations being on .625-inch centers longitudinally and approximately .375-inch centers circumferentially. The inner tubular member 18 of the same wall thickness has perforations of the same transverse dimensions and on the same centers, and is 1.21 inches in outside diameter. Where the perforations are of such size, relative to the overall dimensions of the unit, the aggregate area of the perforations far exceeds the area of the inlet and discharge passages with the result that the skeleton itself offers no resistance whatsoever to the flow of the fluid. This fact also contributes to the facility with which very fine conditioning materials in the form of the filtering layers and the granules or other materials placed in the chambers 29 and 30 may be utilized. Consequently, it has been found that, where a glass filter paper of the very finest porosity available today is employed as the filter wrap about both the inner and outer tubular members and the chambers 29 and 30 are filled with finely divided charcoal or diatomaceous earth, greatly improved filtering and treatment may be achieved without substantially interfering with the fluid flow. At the same time, it has been found that, where the perforations in the tubular members are of the approximate relative sizes as in this particular embodiment, the self cleaning above described is thoroughly accomplished.

Because of these unique features of the cartridge of this invention, a wide variety of filtering materials, some of which have been recognized as having good filtering properties and some of which have not been previously known or considered as such, perhaps because of the mechanical limitations of prior art filtering apparatuses, may be employed. Included within this class of materials are the previously mentioned charcoal, which may be activated charcoal, diatomaceous earth, waddings or other arrangements within the filtration chambers of fibers of glass or other animal, vegetable or mineral origin, and the ion-exchange resins. Where it is sought to remove organic impurities from the fluid such as disease-causing bacterial contaminants from a water supply for example, it has been found that firebrick in crushed, granulated or powdered form is particularly satisfactory in that it demonstrates an ability to absorb a great variety of organic impurities in large quantities.

While the within invention has been described in considerable detail in connection with certain specific embodiments thereof, it is to be understood that the foregoing particularization and detail have been for the purposes of illustration only and do not limit the scope of this invention as it is more precisely defined in the subjoined claims.

I claim:
1. A fluid treatment apparatus comprising a substantially cylindrical sump housing, a substantially cylindrical cartridge within said housing comprising concentrically positioned inner and outer rigid tubular members, a substantial portion of the walls of which are perforated and which define an annular chamber between said tubular members and an axial chamber within the inner tubular member, a flexible and elastic filtering wrapper against and about the outer surface of at least the outer of said tubular members, and means associated with said housing and said cartridge for causing a fluid flow to enter said housing exteriorly of said outer tubular member and to pass through said wrapper, said tubular members and said chambers before departing therefrom wherein the perforations in at least the outer of said tubular members are at least within the range of from .20 to .50 inch in the smaller of their transverse dimensions and the margins of the perforations opening upon the tubular wall about which the filtering wrapper is applied are sharply defined whereby the intermittent starting and stopping of the fluid flow entering said housing will cause the sedimentatious material accumulating upon said wrapper to be loosened and flecked free thereof in a self-cleaning manner.

2. An apparatus according to claim 1 wherein said filtering wrapper is composed of glass fibers.

3. An apparatus according to claim 2 wherein said glass fibers comprise a finely reticulated glass filter paper.

4. An apparatus according to claim 1 wherein at least one of said chambers is at least partially filled with a fluid treating material.

5. An apparatus according to claim 4 wherein said fluid treating material is in particulate form.

6. An apparatus according to claim 5 wherein said fluid treating material is one or more of that class of materials which comprises charcoal, diatomaceous earth, clay, sand, gravel, ion-exchange resins, animal fibers, vegetable fibers, mineral fibers and firebrick.

7. A device according to claim 1 wherein a reticulate plate substantially spanning the cross sectional area of the sump chamber is positioned at the lower end of said cartridge and closely spaced from the bottom of said sump housing.

8. A fluid treatment apparatus comprising a substantially cylindrical sump housing, a substantially cylindrical cartridge within said housing comprising concentrically positioned inner and outer rigid tubular members, a substantial portion of the walls of which are perforated and which define an annular chamber between said tubular members and an axial chamber within the inner tubular member, a flexible and elastic filtering wrapper against and about the perforated outer surface of at least the outer of said tubular members, means associated with said housing and said cartridge for causing a fluid flow to enter said housing exteriorly of said outer tubular member and to pass through said wrapper, said tubular members and said chambers before departing therefrom, and a reticulate plate substantially spanning the cross sectional area of said sump housing positioned at the lower end of said cartridge and closely spaced from the bottom of said sump housing wherein the perforations in at least the outer of said tubular members are relatively large and have sharply defined margins whereby the intermittent stopping and starting of the fluid flow to said housing will cause the sedimentatious material accumulating upon said wrapper to be loosened and flecked free thereof in a self-cleaning manner.

References Cited by the Examiner
UNITED STATES PATENTS

| | | | |
|---|---|---|---|
| 2,057,219 | 10/1936 | Vokes | 210—444 X |
| 2,103,434 | 12/1937 | Pennebaker | 210—443 X |
| 2,554,748 | 5/1951 | Lewis et al. | 210—484 |
| 2,826,308 | 3/1958 | Koupal | 210—457 |
| 2,902,162 | 9/1959 | Humbert et al. | 210—443 X |
| 2,966,990 | 1/1961 | Sicard | 210—443 |
| 3,061,107 | 10/1962 | Taylor | 210—487 |
| 3,189,179 | 6/1965 | McMichael | 210—282 X |
| 3,199,679 | 8/1965 | Salyer | 210—282 X |

REUBEN FRIEDMAN, *Primary Examiner.*

SAMIH N. ZAHARNA, *Examiner.*